3,737,464
DEUTERATED PARAFORMALDEHYDE PROCESS

Joseph G. Atkinson, Montreal, Quebec, and David W. Cillis, Ottawa, Ontario, Canada, assignors to Charles E. Frosst & Co., Montreal, Quebec, Canada
No Drawing. Filed Feb. 24, 1969, Ser. No. 801,782
Claims priority, application Canada, Mar. 16, 1968, 15,065; Jan. 27, 1969, 41,272
Int. Cl. C07c 47/10
U.S. Cl. 260—615.5       6 Claims

ABSTRACT OF THE DISCLOSURE

A method for the preparation of deuterated paraformaldehyde which consists in treating methylene halide with deuterium oxide in the presence of a base to afford deuterated methylene halide, treating said deuterated methylene halide with alkali metal acetate to obtain deuterated methylene diacetate and hydrolyzing the said intermediate to the desired product.

---

This present invention relates to an improved process for preparing deuterated paraformaldehyde and to novel intermediates useful in the preparation of deuterated paraformaldehyde.

In accordance with the present invention, deuterated paraformaldehyde is prepared by deuterating a methylene halide of the formula $CH_2X_2$ wherein the X radicals are the same or different halogen atoms as, for example, chlorine, bromine, iodine and the like; treating the deuterated methylene halide thus obtained with an alkali metal acetates, i.e., i.e., $MOOC-CH_3$ wheerin M is the cation derived from an alkali metal such as the sodium or potassium cation, thereby forming deuterated methylene diacetate and hydrolyzing the deuterated methylene diacetate to the desired deuterated paraformaldehyde.

The initial deuteration is carried out by the exchange of a methylene halide of the formula $CH_2X_2$, wherein X is as defined above, with basic deuterium oxide to form the corresponding deuterated methylene chloride bromide or iodide. The exchange is carried out in the presence of a base such as an alkali metal hydroxide, alkaline earth metal hydroxide, alkali metal oxide or alkaline earth metal oxide, for example, lithium hydroxide, sodium hydroxide, potassium hydroxide, rubidium hydroxide, sodium hydroxide, barium hydroxide, sodium oxide, potassium oxide, barium oxide, calcium oxide or strontium oxide. Optimum results are obtained when the alkali metal or alkaline earth metal hydroxide is in the form of its deuteroxide. The exchange is carried out by refluxing the reactants with stirring for a period of from 14 to 24 hours.

Deuterated methylene diacetate is obtained by refluxing a deuterated methylene halide of the formula $CD_2X_2$ wherein X is as defined above, with an alkali metal acetate using acetic acid or an acetic acid-acetic anhydride mixture as a solvent. It was found that no back exchange of methylene-$d_2$ bromide occurred in the acidic reaction media and, therefore, well deuterated methylene-$d_2$ diacetate is recovered.

The methylene-$d_2$ diacetate thus obtained is easily hydrolyzed in hot water with a trace of mineral acid such as hydrochloric acid to afford an 80% yield of paraformaldehyde-$d_2$.

The present invention will be more fully understood by reference to the following examples:

EXAMPLE 1

Exchange with sodium deuteroxide; methylene bromide-$d_2$

Methylene bromide (274 g.; 1.57 moles) was placed in a 500 ml. single-necked flask fitted with a water condenser and magnetic stirrer. Deuterium oxide (80 g.; 4.0 moles) and sodium deuteroxide (4.2 g.) were added and the mixture was stirred at reflux for 18 hours. The mixture was then cooled and the layers were separated and 256 g. (1.47 moles; 94%) of partially deuterated methylene bromide were recovered. This material was then returned to the exchange flask with deuterium oxide (75.2 g.; 3.76 moles) and sodium deuteroxide (3.95 g.) and was again stirred at reflux for 18 hours. The layers were separated as before and this procedure was repeated 8–10 times until the methylene bromide was better than 98% deuterated as seen by infrared or nuclear magnetic resonance spectra. The fully exchanged methylene bromide, i.e., methylene bromide-$d_2$, was dried on a vacuum line, then distilled at atmospheric pressure (B.P. 95–97° C.) and stored in a brown glass bottle (yield 150 g.). The overall yield on the exchange ranges from 50–60% when fresh deuterium oxide is used throughout.

EXAMPLE 2

Exchange with lithium hydroxide; methylene bromide-$d_2$

A mixture of methylene bromide (44 g.; 0.25 mole), deuterium oxide (20 g., 1.0 mole) and lithium hydroxide (0.6 g.; .025 mole) was heated to reflux for 24 hours. The lower layer of methylene bromide-$d_2$ was separated and analyzed by nuclear magnetic resonance. It was found to contain 36.5 atom percent deuterium. Weight of recovered methylene bromide-$d_2$ was 37 g.

EXAMPLE 3

Exchange with sodium hydroxide; methylene bromide-$d_2$

The experiment was run as in Example 2 except that sodium hydroxide (1.0 g.; 0.025 mole) was used in place of lithium hydroxide. The methylene bromide-$d_2$ thus obtained contained 48.9 atom percent deuterium; yield: 37.6 g.

EXAMPLE 4

Exchange with potassium hydroxide; methylene bromide-$d_2$

The experiment was run as in Example 2 except that potassium hydroxide (1.4 g.; 0.025 mole) was used instead of lithium hydroxide. The methylene bromide-$d_2$ thus obtained contained 38.9 atom percent deuterium; yield: 37.3 g.

EXAMPLE 5

Exchange with rubidium hydroxide; methylene bromide-$d_2$

The experiment was run as in Example 2 except that rubidium hydroxide (2.5 g.; 0.025 mole) was used instead of lithium hydroxide. The methylene bromide-$d_2$ thus obtained contained 40 atom percent deuterium; yield: 37.9 g.

EXAMPLE 6

Exchange with sodium hydroxide; methylene iodide-$d_2$

A mixture of methylene iodide (40 g.; 0.15 mole), deuterium oxide (60 g.; 3.0 moles) and sodium hydroxide (6.0 g.; 0.15 mole) was stirred and refluxed for 18 hours. The lower layer of methylene iodide-$d_2$ thus obtained was separated and analyzed by infrared spectroscopy any found to be 50% deuterated; yield: 27 g.

EXAMPLE 7

Exchange with barium oxide; methylene bromide-$d_2$

A reaction mixture was set up as in Example 2 except that barium oxide (3.83 g.; 0.025 mole) was used instead of lithium hydroxide. The methylene bromide-$d_2$ thus obtained was found by N.M.R. to have 47.8% of its hydrogen replaced by deuterium; yield: 30 g.

EXAMPLE 8

Exchange with sodium oxide: methylene bromide-$d_2$

Upon substituting sodium oxide (0.78 g.; 0.0125 mole) for the lithium hydroxide recited in Example 2 and following the procedure described therein, there was thus obtained 36.5 g. of methylene bromide-$d_2$ containing 48 atom percent deuterium.

EXAMPLE 9

Methylene-$d_2$ diacetate

Methylene bromide-$d_2$ (176 g.; 1.0 mole) was placed in a two litre flask fitted with a reflux condenser and large mechanical stirrer. Six hundred ml. of glacial acetic acid containing 5% by weight acetic anhydride were added and the mixture was stirred. Two hundred and ninety-four g. (3 moles) of dry potassium acetate was added to the flask slowly enough so as not to stop the stirrer. The mixture was then heated to reflux and was allowed to stir at reflux 24 hours. On heating the mixture all of the potassium acetate dissolved and after about one hour at reflux a white solid (potassium bromide) began to crystallize out.

After the reaction mixture had refluxed for 24 hours, the reflux condenser was replaced by a stillhead and a few milliliters of distillate were taken off. This few ml. of distillate was diluted with water to determine if two layers would form. The formation of two layers indicated that unreacted methylene bromide-$d_2$ was present. The distillation was then continued until the distillate no longer contained methylene bromide-$d_2$ which was purified and re-used. The reaction mixture was then cooled with vigorous stirring and then diluted with 1500 ml. ether. The solid precipitate was filtered and washed with ether until no odor of acetic acid remained and the filtrate was distilled. The ether and most of the acetic acid was distilled off at atmospheric pressure, the residue was diluted with ether and refiltered if solid was present. The distillation was continued at 12 mm. and the distillate which was collected at 48–60° C. was saved for redistillation and the product was collected at 61–63° C. The forerun collected at 48–60° C. was then redistilled and the fraction boiling at 61–63° C. was isolated and identified as methylene-$d_2$ diacetate. Both product fractions had a purity greater than 98% by gas chromatography and afforded 83 g. (0.61 mole; 61%) of methylene-$d_2$ diacetate.

EXAMPLE 10

Methylene-$d_2$ diacetate

By following the procedure outlined in 5xample 9 but substituting methylene iodide-$d_2$ for the methylene bromide-$d_2$ recited therein, there is again obtained methylene-$d_2$ diacetate (80.0 g.; 59% yield).

EXAMPLE 11

Paraformaldehyde-$d_2$

Methylene-$d_2$ diacetate (50 g; 0.373 mole) was placed in a 100 ml. flask with 9.0 g. (0.746 mole) of water and 1 g. of concentrated hydrochloric acid. The mixture was stirred at reflux overnight and then allowed to cool slowly. A crop of solid white deuterated paraformaldehyde precipitated out while cooling and this material was filtered out and saved to combine with later crops.

The filtrate was placed in a flask with a magnetic stirrer and a short path distillation head leading to a receiver cooled in liquid nitrogen. The filtrate was then subjected to distillation with stirring and with initial heating under full pump vacuum until only a solid white residue of deuterated paraformaldehyde remained in the flask. When solid began to precipitate out heating was stopped but pumping was continued until the deuterated paraformaldehyde was sufficiently dry to scrape out of the flask. The distillate collected in the liquid nitrogen cooled receiver was warmed and returned to a fresh distillation flask and a second distillation was carried out in the same manner, again leaving a residue of deuterated paraformaldehyde. A third distillation was carried out on this distillate leaving only a trace of deuterated paraformaldehyde. All of the deuterated paraformaldehyde was then combined and placed in a single flask which was heated at 50° C. for three hours under full pump vacuum to dry thoroughly; yield: 10.0 g. (0.312 mole) 83% of paraformaldehyde-$d_2$.

Analysis of paraformaldehyde-$d_2$

A sample of 0.5 g. (0.0156 mole) of paraformaldehyde-$d_2$ was stirred overnight with 10 g. (0.2 mole) methanethiol and 15 ml. ether in a flask fitted with a Dry Ice cooled condenser. The excess methanethiol was distilled off on a vacuum line leaving behind the much higher boiling formaldehyde-$d_2$ dimethylthioacetal. The product was then distilled in a semi-micro apparatus at 5 mm.; B.P. 38–40° C. to afford 1.2 g. (0.0111 mole) 71% yield of formaldehyde-$d_2$ dimethylthioacetal. This material was found by N.M.R. to contain over 98 atom percent deuterium in the methylene group. As it was found that formaldehyde dimethylthioacetal cannot itself be exchanged, the N.M.R. relates solely to the deuteration of the paraformaldehyde-$d_2$ product.

What is claimed is:

1. A method for the preparation of paraformaldehyde-$d_2$ which comprises deuterating a methylene halide at reflux of the formula $CH_2X_2$, wherein X is halogen in the presence of a base selected from an alkali metal-OR or an alkaline earth metal-OR wherein R is hydrogen or deuterium or an alkali metal oxide or alkaline earth metal oxide or alkali metal deuteroxide or alkaline earth metal deuteroxide to afford deuterated methylene halide, heating said deuterated methylene halide up to reflux temperature with an alkali metal acetate in the presence of acetic acid or a mixture of acetic acid and acetic anhydride as solvent to form methylene-$d_2$ diacetate and hydrolyzing the said intermediate to the desired product.

2. A method as claimed in claim 1 wherein the methylene halide is deuterated with deuterium oxide.

3. The method of claim 2 wherein the ethylene halide is converted to deuterated methylene halide by treating the former with deuterium oxide in the presence of an alkali-metal deuteroxide.

4. The method of claim 2 wherein the methylene halide is converted to deuterated methylene halide by treatment with deuterium oxide in the presence of alkali metal hydroxide or alkaline earth metal hydroxide.

5. The method of claim 2 wherein the deuterated methylene halide is converted to deuterated methylene diacetate by treating the former with alkali metal acetate in the presence of a mixture of acetic acid and acetic anhydride.

6. A method according to claim 2 for the preparation of paraformaldehyde-$d_2$, which comprises treating methylene bromide with deuterium oxide and sodium deuteroxide to afford methylene bromide-$d_2$, treating said methylene bromide-$d_2$ with potassium acetate in a mixture of acetic acid and acetic anhydride to obtain methylene-$d_2$ diacetate and subjecting the intermediate thus obtained to hydrolysis by treatment with an aqueous solution of a mineral acid to yield the desired product.

References Cited

UNITED STATES PATENTS

| 3,446,854 | 5/1969 | Hughes et al. | 260—615.5 |
|---|---|---|---|
| 1,306,963 | 6/1919 | Koetschet et al. | 260—340 |
| 2,336,223 | 12/1943 | Coleman et al. | 260—493 |

OTHER REFERENCES

Cem. Abstracts, 16:864[1].

VIVIAN GARNER, Primary Examiner

U.S. Cl. X.R.

260—488 J, 491, 658 R